United States Patent

[11] 3,589,185

[72] Inventor Thomas H. Burgess
 Horsham, Pa.
[21] Appl. No. 855,153
[22] Filed Sept. 4, 1969
[45] Patented June 29, 1971
[73] Assignee Fischer & Porter Co.
 Warminster, Pa.

[54] VORTEX TYPE FLOWMETER
 5 Claims, 7 Drawing Figs.
[52] U.S. Cl. ................................................. 73/194
[51] Int. Cl. ................................................. G01f 1/00
[50] Field of Search ................................................. 73/194

[56] References Cited
UNITED STATES PATENTS
3,116,639 1/1964 Bird ............................ 73/194
Re. 26,410 6/1968 Chanaud ..................... 73/194

OTHER REFERENCES

Mair, " The Effect of a Rear Mounted Disc On The Drag Of A Blunt-Based Body of Revolution," THE AERONAUTICAL QUARTERLY, Nov. 1965, pp. 350— 360, copy in 73—194.

Sharpsteen, " Fluid Amplifier Measures Flow Velocity," CONTROL ENGINEERING, Jan. 1966, pp. 103, copy in 73—194.

Primary Examiner—Charles A. Ruehl
Attorney—Michael Ebert

ABSTRACT: A flowmeter having no moving parts, and including a conduit forming a passage for the fluid to be measured, and an obstacle assembly mounted therein. The assembly is constituted by a contoured block disposed across the conduit, the longitudinal axis of the block being perpendicular to the flow axis of the conduit, and a strip mounted across the conduit behind the block in parallel relation thereto to define a gap which serves to trap Kármán vortices created by the presence of the assembly in the flow path. The vortices are sensed to produce a signal whose periodicity is proportional to flow rate.

PATENTED JUN 29 1971          3,589,185

INVENTOR.
THOMAS H. BURGESS
BY Michael Ebert
ATTORNEY

3,589,185

VORTEX TYPE FLOWMETER

BACKGROUND OF INVENTION

This invention relates generally to fluid flow measuring devices, and more particularly to a flowmeter having no moving parts and including an obstacle assembly disposed in a conduit to produce in the downstream wake thereof, fluid oscillations whose frequency is a function of the rate of flow in the conduit.

It is well-known that under certain circumstances, the presence of an obstacle in a flow conduit will give rise to periodic vortices. Thus in the text of Schlichting, "Boundary Layer Theory" (McGraw-Hill, 1960), it is pointed out (pages 15—17 and 27—31), that when an obstacle in the form of a circular cylinder is disposed in the flow path of an oil stream, changes take place in the field of flow as a function of flow rate.

For small Reynolds numbers, the downstream wake is laminar in nature, but at increasing Reynolds numbers, regular vortex patterns are formed. These patterns are known as "Kármán vortex streets." At still higher frequencies, the vortex patterns become irregular and turbulent in character. The frequency at which vortices are shed in a Kármán vortex street is a function of flow rate, and it is this phenomenon which is exploited to provide a flowmeter having no moving parts.

Vortices having a periodic component created by sharp, swept-back leading edges of winglike obstacles placed in wind tunnels, have been observed by Lambourne and Bryer in their report entitled "The Bursting of Leading-Edge Vortices" - Report No. 3282, National Physical Laboratory, 1961.

In an attempt to develop a practical flowmeter exploiting the Kármán vortex street effect, use has been made of an obstacle in the form of a blunt-based body of revolution having a disc mounted in the rear thereof and spaced therefrom to define a cavity. Mair, in an article appearing in the Nov. 1965 issue of the "Aeronautical Quarterly," noted that the drag of a body of revolution with a blunt base can be substantially reduced by mounting behind the body a disc of somewhat smaller diameter. With a single disc, the base drag was reduced by about 35 percent, and with two discs, a reduction of 53 percent was realized.

Mair indicated that the drag could be increased or diminished by varying the axial spacing between the disc and the body of revolution. In the high-drag region, Mair observed that fluid flow in the cavity between the base of the body and the disc is severely unsteady. To examine this phenomenon, Mair mounted a hot-wire sensor at a downstream position with respect to the disc. A strong signal was generated having a single predominant frequency which could be easily identified with a narrow-band wave analyzer. This frequency was found to be exactly proportional to wind speed but only within a limited range of wind velocities.

An arrangement of the type disclosed by Mair would appear to lend itself readily to the measurement of flow rate. Experience has shown, however, that this arrangement is of little practical value, for the problems of signal detection are such as to preclude its use as a workable flowmeter. It is very difficult with a Mair-type structure, to obtain adequate signal strength and stability, and the unfavorable signal-to-hydraulic-noise ratio is such as to militate against accurate flow-rate information over the desired flow range.

In a Mair-type structure, the frequency and amplitude of oscillations detected at various velocities of fluid flow is not always measurable, and generally can not be related to fluid-flow velocity. The reason for this is that variations in Strouhal number over a considerable range of Reynolds numbers are unpredictable; hence a Mair-type structure is not acceptable as a practical flowmeter.

BRIEF DESCRIPTION OF INVENTION

In view of the foregoing, it is the main object of this invention to provide a practical, low cost flowmeter having no moving parts, the flowmeter including an obstacle assembly mounted within a flow conduit and capable of generating strong, stabilized oscillations in the downstream wake which are free of random fluctuations.

More specifically, it is an object of the invention to provide a flowmeter of the above type, in which the obstacle assembly is constituted by a block mounted across the conduit to intercept the flow of fluid, and having a strip attached to the rear thereof to produce stable fluid oscillations in the wake of the assembly.

A significant advantage of the invention is that the signal derived from the fluid oscillations is relatively strong and stable to afford a favorable signal-to-hydraulic-noise ratio insuring accurate flow-rate information over a broad flow range.

Briefly stated, these objects are accomplished in a flowmeter including a flow conduit forming a passage for the fluid to be measured, and an obstacle assembly mounted therein. The assembly is constituted by a block having a contoured cross section which is uniform through the longitudinal axis thereof, the block being positioned across the conduit with its longitudinal axis at right angles to the flow axis of the conduit, a strip being similarly mounted across the conduit behind the block and being spaced therefrom to define a gap which serves to trap Kármán vortices and to strength and stabilize the vortex street which is sensed to produce a signal whose periodicity is proportional to flow rate.

BRIEF DESCRIPTION OF DRAWING

For a better understanding of the invention as well as other objects and further features thereof, reference is had to the following detailed description to be read in conjunction with the accompanying drawing, wherein.

DESCRIPTION OF INVENTION

Figure 1:
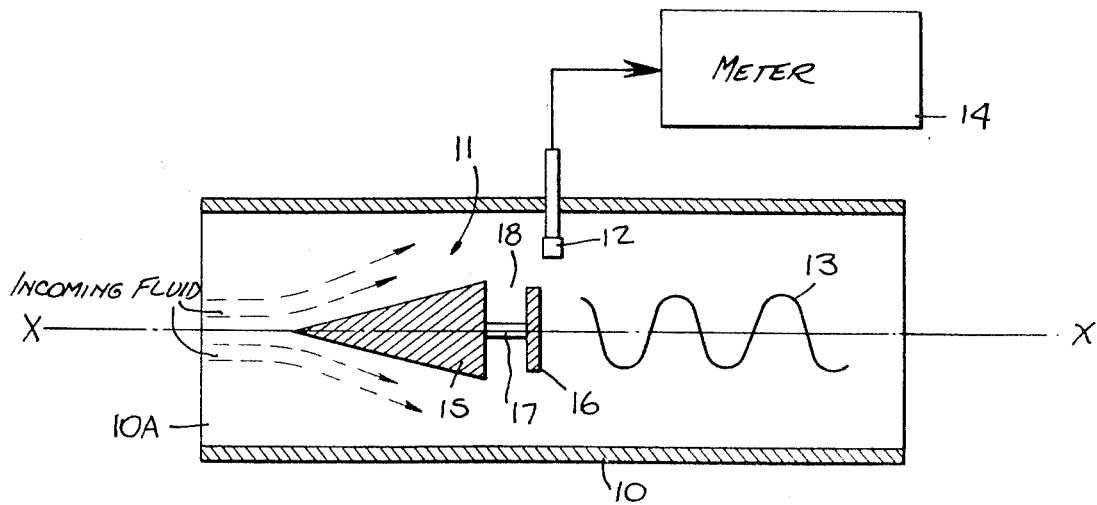
FIG. 1 is a longitudinal section taken through a flow-meter in accordance with the invention.
Figure 2:
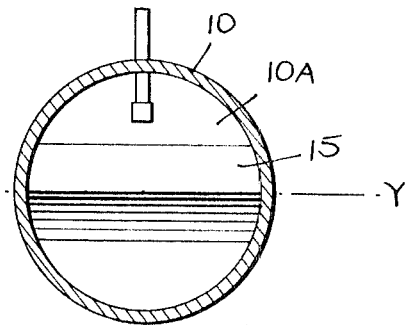
FIG. 2 is a front end view of the flowmeter shown in FIG. 1.
Figure 3:
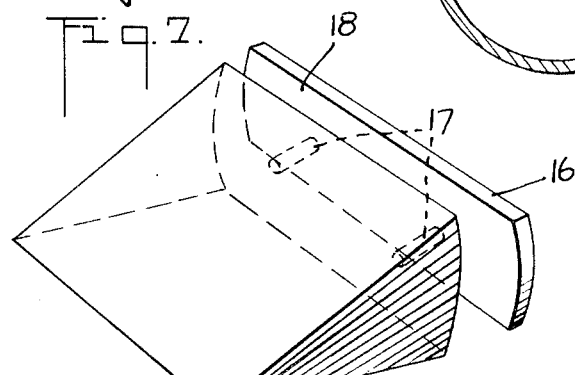
FIG. 3 is a perspective view of the obstacle assembly incorporated in the flowmeter.

Referring now to the drawing, and more particularly to FIGS. 1, 2 and 3, a flowmeter in accordance with the invention comprises a flow conduit 10, an obstacle assembly mounted therein, generally designated by numeral 11, and a sensor 12.

Conduit 10, which is shown as having a circular cross section, but which may have other cross-sectional forms, has an inlet 10A into which a fluid such as air is introduced. The flow impinges on obstacle assembly 11, which acts to divide the flow around and by the obstruction, the assembly functioning to produce fluid perturbations in the form of Kármán vortex streets. The resultant fluid oscillations in the downstream wake, as roughly represented by trace line 13, are sensed by sensor 12 to produce an electric signal which is applied to a suitable indicator or recorder 14.

Obstacle assembly 11 includes a contoured block 15 having a triangular or delta-shaped cross section which is uniform throughout the longitudinal axis Y of the block, this axis being perpendicular to the flow axis X of the conduit. The apex of the block faces the incoming fluid, the inclined faces thereof forming leading edges which are swept by the flow of fluid. The creation of vortices by a wing or block having a delta formation, is set forth in detail in the above-cited report of Lambourne and Bryer, and will not, therefore, be repeated.

Also mounted across the conduit is a strip 16 which completes the assembly, the strip being maintained by pins 17 in spaced relation to the block, with the plane of the strip being parallel to the base of the block. The cavity or gap 18 created between the block and strip of the assembly tends to trap the vortices and to strengthen and stabilize the vortex street produced thereby. The width of the strip is preferably somewhat smaller than the width of the base of the block.

Sensor 12, which is shown at a downstream position following strip 16, may be in the form of a thermistor which conducts an electrical current and is cooled by the fluid oscillations. The thermistor has a large negative temperature coefficient of resistance, as a consequence of which its internal resistance varies periodically in accordance with the frequency of the fluid oscillations in the downstream wake. The resultant electrical signal is applied to the indicator 14, and since its frequency is proportional to that of the fluid oscillations, the reading of the indicator may be calibrated in terms of flow rate. In practice, the sensor is so placed in the downstream wake as to achieve the optimum signal-to-noise ratio, and in some instances, it may even be placed within gap 18.

Figure 4:
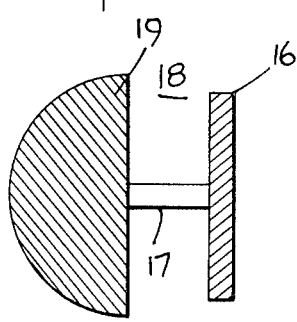
FIG. 4 is a side view of a modified form of obstacle assembly.

In lieu of a block having a delta profile, one may use a semicircular profile 19, as shown in FIG. 4, or any other profile affording leading edges creating the desired fluid oscillations in the downstream wake. In place of a thermistor, one may use a sound-responsive transducer, in that the oscillations lie in the audio range, or one may use a differential pressure sensor. The nature of the sensor forms no part of the present invention.

Figures 6, 7:
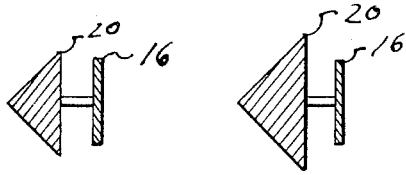
FIG. 6 is a section taken in the plane indicated by line 6–6 in FIG. 5.
FIG. 7 is a section taken in the plane indicated by line 7–7 in FIG. 5.
Figure 5:
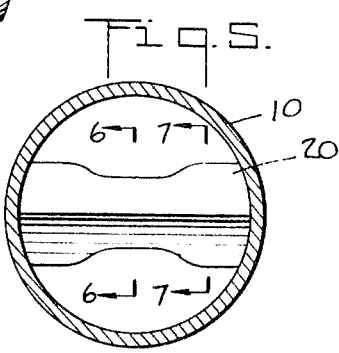
FIG. 5 is a front end view of another embodiment of a flowmeter in accordance with the invention.

In some instances, it may be desirable to characterize the cross section of the block in the obstacle assembly to compensate for the flow profile of the fluid being measured, or for reasons of linearity. Thus, as shown in FIGS. 5, 6 and 7, obstacle block 20 is formed so that its cross-sectional dimensions are always triangular in form but of varying area, the area of the central portion of the block, as illustrated in FIG. 6, being smaller than the end portions thereof, as illustrated in FIG. 7.

While there have been shown and described preferred embodiments of vortex-type flowmeters in accordance with the invention, it will be appreciated that many changes and modifications may be made therein without, however, departing from the essential spirit of the invention.

What I claim is:

1. A flowmeter of the vortex type, comprising:
   A. a flow conduit through which fluid to be measured is conducted,
   B. an obstacle assembly disposed in said conduit, said assembly being constituted by a block mounted across the conduit to divide incoming fluid flow around and by the assembly, said block being contoured to define leading edges which are swept by the flow to produce a vortex street in the downstream wake of the block having a periodicity which is a function of flow rate, and a strip mounted behind said block in parallel relation thereto to define a gap acting to strengthen and stabilize the vortex street, and
   C. a sensor disposed in said downstream wake to provide a signal whose frequency is indicative of flow rate.

2. A flowmeter as set forth in claim 1, wherein said conduit has a circular cross section.

3. A flowmeter as set forth in claim 1, wherein said block has a delta profile, the apex of which faces the incoming fluid.

4. A flowmeter as set forth in claim 1, wherein said block has a semicircular profile, the curved portion of which faces the incoming fluid.

5. A flowmeter as set forth in claim 1, wherein the block cross section has a uniform shape but varies in area throughout its length to compensate for the flow profile of the incoming fluid.